Figure 1:
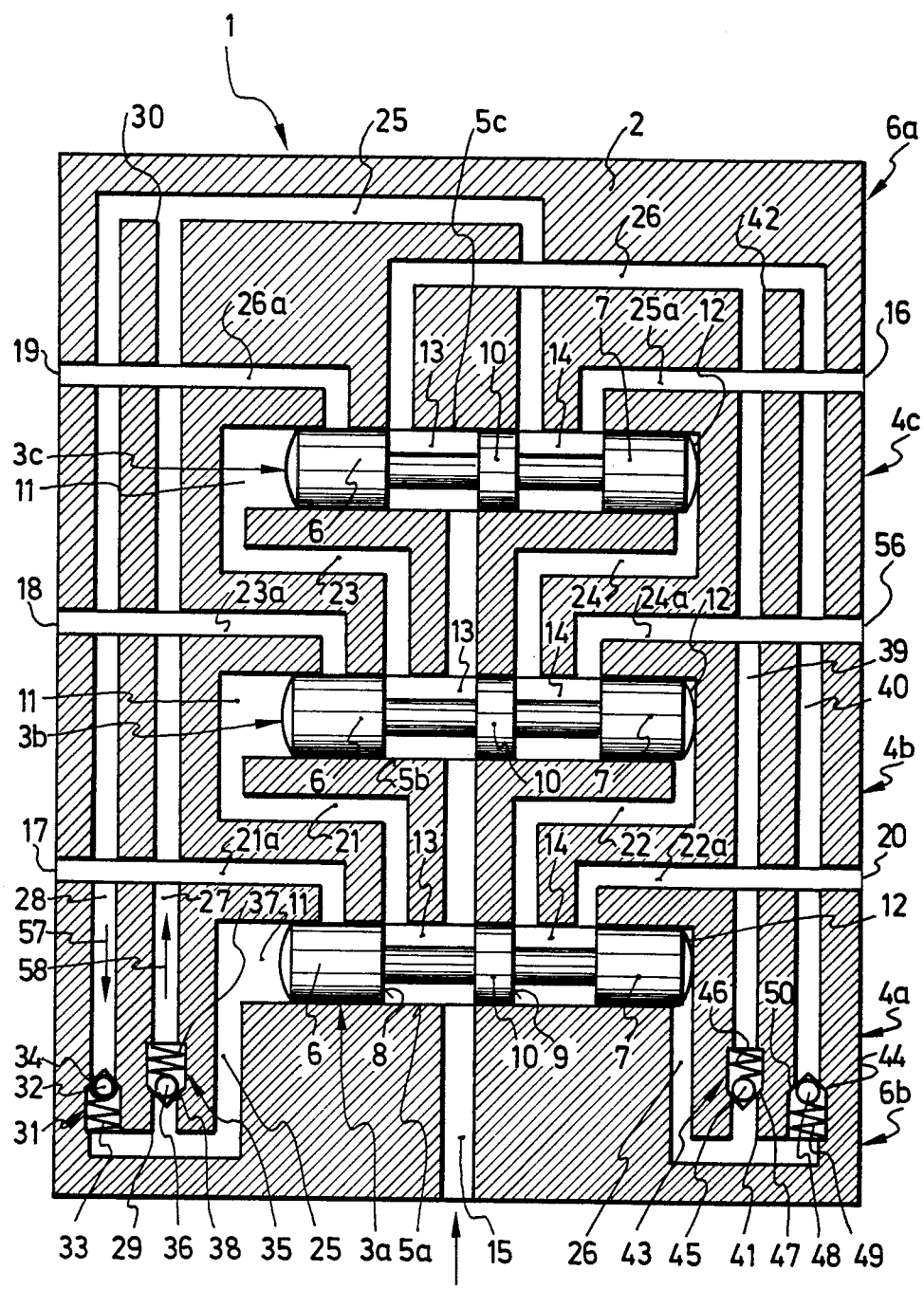

United States Patent [19]

Saam

[11] Patent Number: 4,712,649

[45] Date of Patent: Dec. 15, 1987

[54] PROGRESSIVE DISTRIBUTOR FOR LUBRICANTS

[75] Inventor: Werner Saam, Oberhausen-Rheinhausen, Fed. Rep. of Germany

[73] Assignee: Joseph Vogele AG, Mannheim, Fed. Rep. of Germany

[21] Appl. No.: 921,070

[22] Filed: Oct. 21, 1986

[30] Foreign Application Priority Data

Dec. 4, 1985 [DE] Fed. Rep. of Germany ....... 3542934

[51] Int. Cl.$^4$ ............................................. F16N 25/02
[52] U.S. Cl. ..................................... 184/7.4; 137/119
[58] Field of Search ........................... 137/119; 184/7.4

[56] References Cited

U.S. PATENT DOCUMENTS

| | | | |
|---|---|---|---|
| 2,146,424 | 2/1939 | Dirkes | 184/7.4 |
| 2,792,911 | 5/1957 | Harter | 184/7.4 |
| 3,371,745 | 3/1968 | Callahan | 184/7.4 |

*Primary Examiner*—Robert G. Nilson
*Attorney, Agent, or Firm*—Finnegan, Henderson, Farabow, Garrett & Dunner

[57] ABSTRACT

The invention relates to a progressive distributor for lubricants, comprising at least two distributor sections each including a double piston guided in a cylinder chamber for reciprocating therein between two end positions, a supply passage, and a number of passages interconnecting adjacent cylinder chambers as well as the first cylinder chamber and the last cylinder chamber in a common plane and leading to discharge outlets, the two end sections of each cylinder chamber acting alternately as a pressure chamber for pressurizing the respective piston and as a metering chamber for metering the lubricant. In known progressive distributors having cylinder chambers disposed in a common plane, the presence of entrapped air particularly in the long passages interconnecting the first and last cylinder chambers frequently prevents the lubricant from being properly discharged. In accordance with the invention this disadvantage is eliminated by the provision that of said number of passages at least the ones interconnecting the first cylinder chamber and the last cylinder chamber in the common plane is formed over part of its length by two juxtaposed branch passages provided with closure elements therein arranged to close in opposite directions of flow, the closure elements being disposed closely adjacent to or in the metering chamber formed by the respective end section of the cylinder chamber.

7 Claims, 2 Drawing Figures

PROGRESSIVE DISTRIBUTOR FOR LUBRICANTS

DESCRIPTION

The present invention relates to a progressive distributor of the type defined in the generic clause of patent claim 1.

In a progressive distributor of this type known from DE-GM No. 7,226,041, the arrangement of the cylinder chambers in a common plane of the distributor results in an excessive length of passages between the respective first and last cylinder chambers. Particularly when there is a greater number of cylinder chambers, for instance six, the lubricant discharge may fail due for instance to the entrapment of air, because the limited volume of the metering chamber is then no longer sufficient for reliably displacing the lubricant volume contained in the long passage. The intermittent pressurization of the lubricant will then merely result in the lubricant being moved back and forth in the passage without reaching the discharge outlet. Apart from the fact that lubrication points connected to the respective discharge outlet, or a further progressive distributor disposed downstream thereof, will then no longer be supplied with the lubricant, a high-penetration lubricant would tend to solidify or be condensed, finally resulting in an increased flow resistance and obstruction of the progressive distributor. The self-cleaning capability in the case of a lubricant change is unsatisfactory. Entrapped air is no longer displaced and affects the distribution accuracy of the lubricant to the individual outlets to an increasing degree.

The same disadvantages are found in a progressive distributor known from DE-GM No. 7,332,009. In this construction specifically the passages between the first and the last cylinder chambers are likewise of excessive length.

The progressive distributor according to DE-OS No. 1,902,587 also suffers from these disadvantages due to long passages.

In a progressive distributor of a different type known from DE-PS No. 2,917,863 it has been attempted to avoid the above mentioned disadvantages by the provision that within the housing of the progressive distributor the individual cylinder chambers are arranged in a configuration-in-space resulting in relatively short passages of equal length. The production of a progressive distributor of this type is rather expensive, however, its construction being also disadvantageous with regard to the connection of external conduits thereto due to the necessarily three-dimensional distribution of the discharge outlets. Any later amendment of the number of lubrication points is not possible. In the case of small metering volumes the venting of the relatively large passages offers some problems.

Known from DE-GM No. 84 13 228 is a progressive distributor of still another type, wherein a unidirectional flow is achieved by the provision of a great number of control edges and control passages, whereby the above mentioned disadvantages are noticed to a reduced degree only.

Known finally from DE-OS No. 3,412,836 is a progressive distributor having valves mounted in the discharge outlets for preventing the previously expelled lubricant from flowing back into the progressive distributor. The long passages in the progressive distributor result in the same disadvantages, however, as explained above.

It is an object of the invention to provide a progressive distributor of the type defined in the introduction, which is free of the disadvantages resulting from long passages, notwihtstanding its simple construction with its cylinder chambers disposed in a common plane.

In accordance with the invention this object is attained by the characteristics set forth in the characterizing clause of patent claim 1.

This construction permits the long passages required for the simplified arrangement of the cylinder chambers in a common plane to be still provided, the disadvantageous effect of the long passages has been eliminated, however, by the provision that over a major part of their length these passages are devided into to branch passages extending side by side and provided with closure elements, so that the lubricant flows through each branch passage in a single direction only. In this manner it is avoided that even in the presence of entrapped air the metered lubricant expelled into the passage moves back and forth in a bidirectional flow passage without being discharged at the respective discharge outlet. The relative proximity of the closure elements to the metering chamber formed by the end portion of the cylinder chamber ensures that at least a major portion of the lubricant volume expelled from the metering chamber passes the closure element opening in the respective direction and is then prevented from being returned to the metering chamber due to the closing of the closure element. In the same manner it is also ensured that any entrapped air is expelled and that the lubricant is reliably discharged at the associated discharge outlet even in the case of a small metering volume. Entrapped air may in fact initially delay the lubricant discharge. The lubricant will be reliably discharged, however, in properly metered amounts after a small number of strokes. Under these aspects it would even be possible for each passage to comprise two branch channels provided with closure elements acting in opposite directions of flow. In practice it is sufficient, however, to design only the longer or longest passages in this manner.

A further advantageous embodiment is evident from claim 2. This embodiment ensures a favourable relation between the lubricant volume outside the metering chamber and upstream of the closure elements and the lubricant volume contained in the metering chamber, whereby the long passage is reliably vented and the lubricant is not ineffectively moved back and forth in the passage.

Also highly effective is an alternative embodiment as disclosed in claim 3. This construction results in a favourable relationship between the lubricant amount contained in the alternating-flow common passage section and the volume of the associated cylinder chamber also in the return flow direction.

A particularly effective embodiment is disclosed in claim 4. Spring-biased non-return valves operate reliably in any position. Their opening pressure can be adjusted to very low levels as desired.

A further advantageous embodiment is described in claim 5. The assembly of a progressive distributor from disk-shaped sections is useful in practice as it permits the number of distributor sections as well as the individual metering volumes to be varied. Irrespective of the number of distributor sections, the provision of the branch passages and closure elements ensures that the ineffective back and forth displacement of the metered lubricant volumes does not occur.

In this context the characteristic of claim 6 offers the advantage that the various distributor sections may be manufactured in the conventional manner and may then be combined with the connection disk having this particular construction.

Another advantageous embodiment is finally set forth in claim 7. Sections of the branch passages are here provided in all of the distributor passages.

Figure 2:
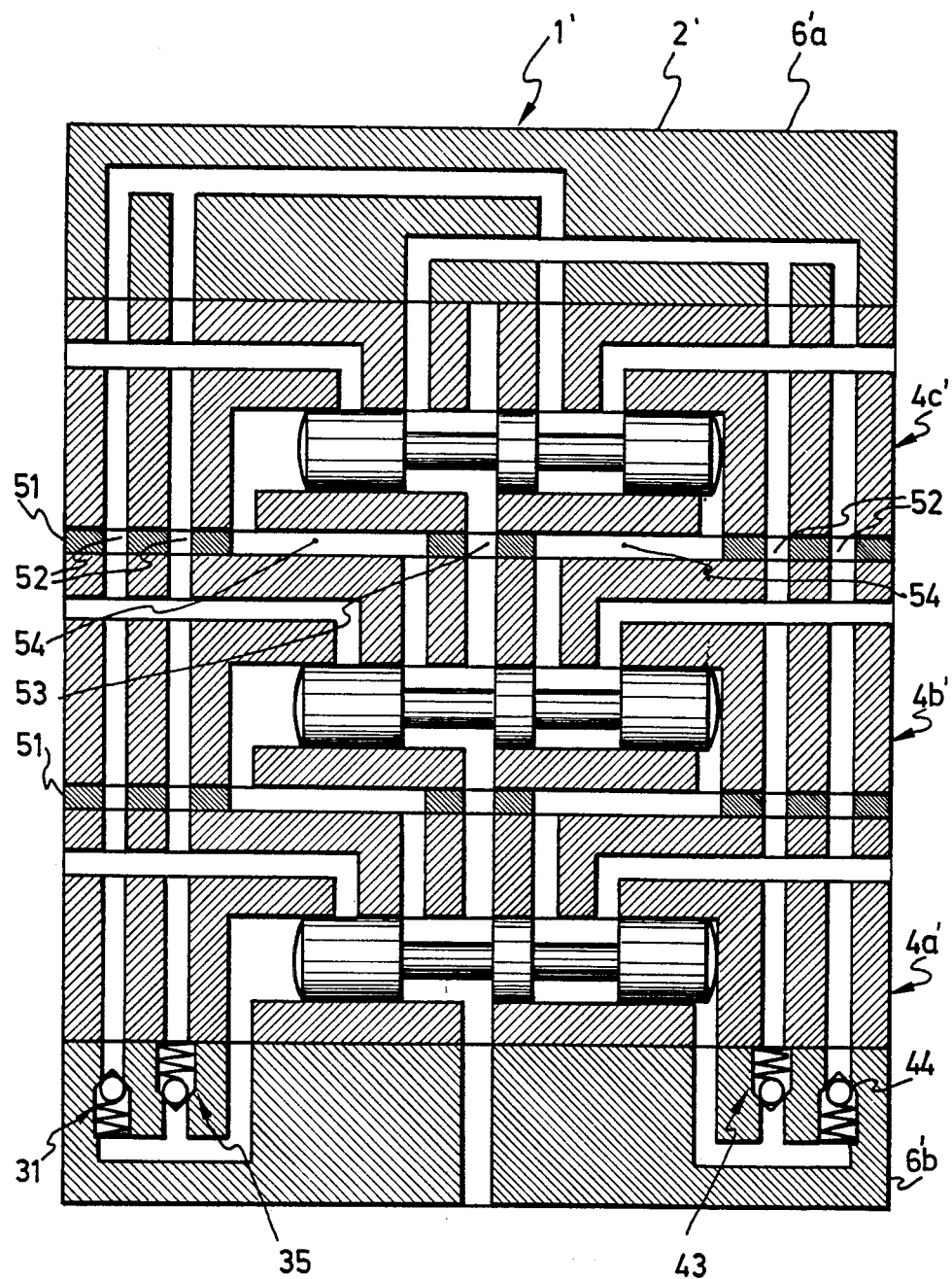

Embodiments of the subject matter of the invention shall now be described with reference to the accompanying drawings, wherein:

FIG. 1 shows a diagrammatical longitudinal sectional view of a progressive distributor having three distributor sections, and FIG. 2 shows an embodiment of a progressive distributor corresponding to the one shown in FIG. 1 and assembled as a suitable combination of disk-shaped elements.

A progressive distributor for lubricants such as oil or grease has, as shown in FIG. 1, a block-shaped housing 2 including a stack of three distributor sections 4a, 4b and 4c and completed by a top cover section 6a and a bottom connection section 6b. Disposed in a common vertical plane of housing 2 are three spaced cylinder chambers 5a, 5b, 5c each containing a double piston 3a, 3b, 3c for back and forth displacement therein between two end positions. A progressive distributor of the type shown in FIG. 1 could also be provided with only two cylinder chambers or with any number of such chambers, in practice up to twelve.

Each double piston 3a, 3b, 3c comprises a lefthand and a righthand piston portion 6 and 7, respectively, and a center portion 10 therebetween formed with two control grooves 8 and 9. In their respective cylinder chambers 5a, 5b, 5c each double piston 3a, 3b, 3c defines two end portions 11, 12 alternately acting either as a metering chamber or as a control chamber or as a pressure chamber. Depending on the position of double piston 3a, 3b, 3c, control grooves 8 and 9 define two separate annular control sections 13 and 14.

A central supply passage 15 extends from the bottom side of housing 2 to the three cylinder chambers 5a, 5b, 5c so as to communicate with all control chambers 13 in the position of double pistons 3a, 3b, 3c as shown.

In the embodiment shown, the outer wall of housing 2 is provided with six discharge outlets 16, 17, 18, 19, 20 and 56 for the connection thereto of lubricant consumer supply conduits (not shown) or of conduits leading to further distributors.

Supply passage 15 is continuously supplied in the direction indicated by an arrow with a lubricant at a predetermined pressure and in a selectively adjustable amount.

The individual cylinder chambers 5a, 5b, 5c are interconnected by passages, with further passage sections extending therefrom to the respective discharge outlets.

A passage 21 leads from end portion 11 of cylinder chamber 5b to control section 13 of cylinder chamber 5a. Associated with passage 21 is a passage section 21a leading to discharge outlet 17. Passage section 21a opens into cylinder chamber 5a at a location separated from control section 13 by piston portion 6 in the position of double piston 3a as shown. A passage 22 extends from end portion 12 of cylinder chamber 5b to control section 14 of cylinder chamber 5a. A passage section 22a associated therewith extends to discharge outlet 20 and is in communication with control section 14 in the position of double piston 3a as shown. A further passage 23 leads from lefthand end section 11 of cylinder chamber 5c to control section 13 of cylinder chamber 5b, with an associated passage section 23a leading to discharge outlet 18. Another passage 24 leads from righthand end section 12 of cylinder chamber 5c to control chamber 14 of cylinder chamber 5b with an associated passage section 24a leading to discharge outlet 56. A long passage 25 leads from end section 11 of cylinder chamber 5a to control section 14 of cylinder chamber 5c, with an associated passage section 25a leading to discharge outlet 16. Another long passage 26 finally leads from righthand end section 12 of cylinder chamber 5a to control section 13 of cylinder chamber 5c, with an associated passage section 26a leading to discharge outlet 19. Passage sections 21a, 22a, 23a, 24a, 25a and 26a are substantially of equal length, as are also passages 21, 22, 23 and 24. Only passages 25 and 26 are of a substantially greater length, as they interconnect the first and the last cylinder chamber 5a, 5c in the common plane.

Over a substantial portion of its length passage 25 is divided into two branch passages 27 and 28 extending from a branch point 29 and merging again at a convergence point 30. In the same manner, passage 26 is divided into two branch passages 39, 40 extending from a branch point 41 over part of its length to a convergence point 42.

Provided in branch passage 28 of passage 25 adjacent lefthand end section 11 of cylinder chamber 5a is a closure element 31 arranged to close in a flow direction opposite to an arrow 57. In particular, closure element 31 is a non-return valve having a spherical valve member 32 biased by a spring 33 into engagement with a seat 34. Another closure element 35 is provided in branch passage 27 for closing in the opposite flow direction and opening in the direction of an arrow 58. Closure element 35 is again a non-return valve having a spherical valve member 36 biased by a spring 37 into engagement with a seat 38. In a similar manner branch passages 39, 40 are provided with respective closure elements 43, 44 of the same type comprising valve members 45, 48, seats 47, 50 and springs 49, 46, the two closure elements 43, 44 being arranged to close in opposite directions of flow.

The progressive distributor shown in FIG. 1 operates as follows: Proceeding from the position of double pistons 3a, 3b and 3c shown in FIG. 1, the lubricant supplied under pressure through supply passage 15 is effective to pressurize control sections 13 of the three cylinder chambers 5a, 5b and 5c the supply pressure being transmitted through passages 21, 23 and 26, branch passage 40 and opened closure element 44 to righthand end portion 12 of cylinder chamber 5a. Lefthand end portion 11 of cylinder chamber 5a meanwhile contains a determined lubricant amount in a substantially nonpressurized condition. Passage 25 including branch passages 27, 28 and passage section 25a as well as control section 14 are filled with lubricant. The pressure in lefthand end sections 11 of cylinder chambers 5b and 5c is effective to retain double pistons 3b and 3c at their righthand end positions. The pressure in righthand end section 12 of cylinder chamber 5a now starts to displace double piston 3a to the left in FIG. 1. As a result, the lubricant contained in the metering chamber formed by end section 11 of cylinder chamber 5a is progressively expelled to thereby open closure element 35. The lubricant enters branch passage 27 in the direction of arrow 58 and proceeds through the upper portion of passage 25 into control section 14, and from there through passage section 25a towards discharge outlet 16 to be expelled therefrom. As double piston 3a moves to the left, its center portion 10 passes over supply passage 15, so that control section 13 is separated from supply passage 15, while control section 14 is brought into communication with supply passage 15. At the same time communication is established between passage section 21a and passage 21 via control section 13, while the communication between passage section 22a and passage 22 is interupted by righthand piston portion 7 of double piston 3a. As a result, double piston 3b is no longer retained in its end position, permitting it to be displaced to the left by the pressure in end portion 12 of cylinder chamber 5b. The lubricant is thereby expelled from lefthand end portion of cylinder chamber 5b through passage 21, control section 13 and passage section 21a towards discharge outlet 17. Double piston 3a is meanwhile hydraulically arrested in its lefthand end position by the pressure acting thereon through passage 26 and its branch passage 40. In the same manner double piston 3b is arrested in its lefthand end position by the pressure acting thereon through passage 22 as soon as the lubricant has been expelled from end portion 11 of cylinder chamber 5b. The displacement of double piston 3b has resulted in control section 13 being separated from supply passage 15 and in communication having been established between control section 13 and passage section 23a, while communication between passage section 24a and control section 14 of cylinder chamber 5b has been interrupted, the latter having been brought into communication with supply passage 15. Subsequently the lubricant is supplied under pressure to righthand end portion 12 of cylinder chamber 5c through control section 14 of cylinder chamber 5b and passage 24, so that double piston 3c is displaced to the left, whereby the lubricant is expelled from lefthand end portion 11 through passage 23, control section 13 and passage section 23a towards discharge outlet 18. This results in control section 13 of cylinder chamber 5c being separated from supply passage 15 and connected to passage portion 26a, while control section 14 is separated from passage section 25a and connected to supply passage 15. As a result, double piston 3a is no longer hydraulically arrested in its lefthand end position. The lubricant is now supplied under pressure to lefthand end portion 11 of cylinder chamber 5a from supply passage 15 through control section 14 of cylinder chamber 5c, passage 25, branch passage 28 and closure element 31, causing the latter to be opened. Double piston 3a is thus returned to its righthand end position shown in FIG. 1, with associated piston portion 7 acting to expel the lubricant contained in end section 12 through passage 26, closure element 43, branch passage 39, control section 13 of cylinder chamber 5c and passage section 26a towards discharge outlet 19. This results in the hydraulic pressure arresting double piston 3b being relieved, whereupon the hydraulic pressure acts on double piston 3b in lefthand end portion 11 of cylinder chamber 5b. As a result, double piston 3b is displaced to its righthand end position shown in FIG. 1, whereby the lubricant contained in end portion 12 of cylinder chamber 5b is expelled through passage 22, control section 14 and passage section 22a towards discharge outlet 20. This displacement results in control section 13 of cylinder chamber 5b being again connected to supply passage 15 to thereby relieve the hydraulic pressure arresting double piston 3c. Subsequently the pressure is supplied through passage 23 to lefthand end portion 11 of cylinder chamber 5c to displace double piston 3c to its righthand end position shown in FIG. 1, whereby the lubricant is expelled from righthand end portion 12 through passage 24, control section 14 and passage section 24a towards discharge outlet 56. The components of the lubricant distributor are then again in their positions shown in FIG. 1, preparatory to a further cycle of six discharge strokes.

It is obviously also possible to combine several of the discharge outlets shown with one another. As long as the lubricant is supplied to supply passage 15, the progressive distributor 1 acts to distribute the lubricant at the preestablished proportions, an increase of the lubricant supply rate to supply passage 15 resulting in a corresponding increase of the metered lubricant amounts discharged through the discharge outlets.

The embodiment of a progressive distributor 1' shown in FIG. 2 differs from the embodiment shown in FIG. 1 solely by structural details, its operating principle being the same. Progressive distributor 1' of FIG. 2 is composed of a plurality of disk units which may be selectively combined in any manner, for instance to the purpose of varying the individual lubricant discharge volumes. The individual distributor sections 4a', 4b', 4c' are formed as disks having complementary end face interconnection patterns and stacked upon one another with washers 51 interposed therebetween. Each washer 51 is formed with bores 52, 53 and slots 54 effective to establish communication between the respective passages. The upper end of housing 2' of progressive distributor 1' is closed off by a cover disk 6a' having portions of passages formed therein. The lower end of housing 2' is closed off by a connection disk 6b' containing closure elements 31, 35 and 43, 44.

The invention is not restricted to the embodiments described and depicted in the drawings by way of example. Within the limits of the overall construction it is thus possible to minimize the volume of those passages and passage sections through which the lubricant flows in both directions. To this purpose closure elements 31, 35 and 43, 44, respectively, may be located immediately adjacent the respective end portion 11 or 12. To the same purpose branch points 30 and 42 may be located immediately adjacent the associated control chambers 13 and 14 of cylinder chamber 5c.

I claim:

1. A progressive distributor for lubricants supplied under pressure and discharged in metered amounts through at least one outlet in successive pulses, comprising at least two distributor sections each including a double piston housed in a cylinder chamber for reciprocating between two end positions, a supply passage leading to said cylinder chambers disposed in a common plane of said distributor, and passages interconnecting adjacent cylinder chambers as well as the first cylinder chamber and the last cylinder chamber in said plane and leading to discharge outlets, each of the two end portions of each cylinder chamber acting alternately as a control chamber for the pressurization of the double piston and as a metering chamber for the lubricant expelled therefrom by the displacement of said piston, characterized in that at least each passage (25, 26) connecting said first cylinder chamber (5a) to said last cylinder chamber (5c) in said plane is formed over at least part of its length of two juxtaposed branch passages (27, 28; 39, 40), that both said branch passages (27,28; 39,40) are provided therein with closure elements (31,35,43,44) closing in mutually opposite flow directions, and that said closure elements (31,35,43,44) are disposed closely adjacent to a metering chamber formed by the end portion (11,12) of said cylinder chamber (5a).

2. A progressive distributor according to claim 1, characterized in that said passage (25,26) is branched (at 29, 41) into said branch passages (27,28;39,40) adjacent said end portion (11,12) of said cylinder chamber (5a), and that the sum of the volumes of said passage (25,26) between said metering chamber and said branch location (29, 41) and of said two branch passages (27,28;39,40) up to the location of said closure elements (31,35,43,44) is smaller than the metering volume of said metering chamber formed by said end portion (11,12).

3. A progressive distributor according to claim 2, characterized in that said branch passages (27,28; 39,40) converge at a point of convergence (30,42) adjacent the other cylinder chamber (5c) connected to said passage (25,26), the volume of said passage (25,26) between a control chamber (13,14) formed by a portion of said cylinder chamber (15) connected to said passage (25,26), and said point of convergence (30,42) being smaller than the volume of said control chamber (13,14).

4. A progressive distributor according to claim 1, characterized in that said closure elements (31,35;43,44) comprise non-return valves having spring-biased valve elements (32,36;45,48) engaged with a respective seat (34,38;47,50) in their closing direction.

5. A progressive distributor according to claim 1, characterized in that said distributor sections (4a', 4b', 4c') are of disk-shaped configuration having complementary end face patterns of said passages, and are preferably disposed between a cover disk (6a') and a connection disk (6b', 6b", 6b'") having complementary end face connection patterns.

6. A progressive distributor according to claim 5, characterized in that said closure elements (31,35;43,44) are accommodated in said connection disk (6b', 6b", 6b'").

7. A progressive distributor according to claim 5 or 6, characterized in that, proceeding from said connection disk (6b'), said branch passages (27,28,39,40) extend through all of the distributor section disks (4a', 4b', 4c') provided and into said cover disk (6a') to converge within said cover disk (6a').

* * * * *